US006073943A

United States Patent [19]

Serrault

[11] Patent Number: 6,073,943

[45] Date of Patent: Jun. 13, 2000

[54] CONTAINER FOR COLLECTING TRASH AND METHOD FOR OPERATING SAME

[75] Inventor: Jean-Pierre Serrault, Colombes, France

[73] Assignee: Compagnie Plastic Omnium, Lyons, France

[21] Appl. No.: 08/652,795

[22] Filed: May 23, 1996

[30] Foreign Application Priority Data

May 23, 1995 [FR] France .................................. 95 06106
Mar. 19, 1996 [FR] France .................................. 96 03413

[51] Int. Cl.[7] ................................ B62B 3/10; B62B 3/02

[52] U.S. Cl. .................................... 280/47.26; 280/47.33; 280/30

[58] Field of Search ............................ 280/30, 37, 47.19, 280/47.26, 652, 42, 651, 47.24, 47.33

[56] References Cited

U.S. PATENT DOCUMENTS

| | | | |
|---|---|---|---|
| 2,371,472 | 3/1945 | Ruff et al. . | |
| 2,472,203 | 6/1949 | Friedmann | 280/652 |
| 2,564,939 | 8/1951 | Weast . | |
| 2,668,977 | 2/1954 | Reece | 280/47.19 |
| 2,716,558 | 8/1955 | Sullivan | 280/651 |
| 2,832,606 | 4/1958 | Patterson | 280/37 |
| 2,891,803 | 6/1959 | Mintz . | |
| 3,135,527 | 6/1964 | Knapp . | |
| 3,376,986 | 4/1968 | Farber | 280/47.24 |
| 4,631,877 | 12/1986 | Molodecki | 52/70 |
| 4,746,059 | 5/1988 | Jackson | 229/23 R |
| 4,753,367 | 6/1988 | Miller et al. | 220/404 |
| 4,953,878 | 9/1990 | Sbragia | 280/30 |
| 5,363,980 | 11/1994 | Mulcahy | 220/404 |
| 5,460,391 | 10/1995 | Gantz et al. | 280/30 |
| 5,464,237 | 11/1995 | Saporiti | 280/30 |
| 5,730,451 | 3/1998 | Walker | 280/47.26 |

FOREIGN PATENT DOCUMENTS

| | | |
|---|---|---|
| 1 017 360 | 12/1952 | France . |
| 2 473 997 | 7/1981 | France . |
| 2 579 158 | 9/1986 | France . |
| 2 663 307 | 12/1991 | France . |
| 37 03 034 | 2/1987 | Germany . |

*Primary Examiner*—Paul N. Dickson
*Assistant Examiner*—Bridget Avery
*Attorney, Agent, or Firm*—Oliff & Berridge, PLC

[57] ABSTRACT

A container for trash collection includes a rear wall, a front wall, two side walls connecting the front and rear walls, and a bottom wall. The two side walls are deformable and can fold to allow the front and rear walls to come together, and the bottom wall is pivotably mounted on either the front or the rear wall, thus forming a compact structure.

18 Claims, 6 Drawing Sheets

CONTAINER FOR COLLECTING TRASH AND METHOD FOR OPERATING SAME

BACKGROUND OF THE INVENTION

The present invention relates to a container such as a wheeled can for collecting trash. The invention also relates to a method for operating a trash collecting container.

Containers are known that have a rear wall, a front wall, side walls, and a bottom wall defining an enclosure of generally parallelipipedic shape. A typical container is generally provided at its rear part with wheels for rolling the container and is also provided on its front wall with a hooking structure for lifting, tipping, and emptying the container by a removal vehicle.

Producers of large volumes of trash, particularly businesses such as florists, fishmongers, and pharmacies, use typical containers which occupy a large storage space. Due to the lack of storage space, only a limited number of containers can be stored, and producers of large amounts of trash fill the available containers rather quickly and pile the remaining trash on the sidewalk.

SUMMARY OF THE INVENTION

One object of the invention is to provide a novel container having two deformable side walls that can fold to allow the front and rear walls to be brought together. The bottom wall is pivotably mounted on either the front or the rear wall.

Another object of the invention is to produce a container having a compact storage size, which is smaller than that of a known nonfolding container, thus facilitating storage of empty containers.

In accordance with one aspect of the invention, there is provided a container for collecting trash, comprising a rear wall, a front wall, two side walls connecting the front and rear walls, wherein the two side walls are deformable and foldable to allow the front and rear walls to approach one another, and a bottom wall pivotably mounted on one of the front and the rear wall.

In a preferred embodiment of the invention, each side wall may have two flaps articulated to each other by one edge and articulated by the opposite edge to either the rear wall or the front wall. Advantageously, the container may also have at least one element for holding the container in the unfolded position.

In a preferred embodiment of the invention, the container may have two retaining elements each of which is associated with one of the side panels, each retaining element being mounted to be displaceable along the geometric axis of articulation of the two flaps of the associated side panel, between a locked position in which it engages the two flaps to hold them in the unfolded position, each extending away from the other, and a raised position allowing the flaps to assume a folded position. Advantageously, at least one of the retaining elements may be shaped to fit over the front and rear walls when the container is folded, to keep it in this state. Also, each retaining element may be provided with a handle.

Thus, the retaining elements of the container in the unfolded position can be used to help the user fold or unfold the container with no risk of becoming soiled or injured during this operation, for example, by pinching the fingers between the flaps of the side walls. In addition, the retaining elements are particularly reliable in operation, and are compatible with the harsh utilization conditions to which containers are subjected.

In another preferred embodiment, each retaining element advantageously may have an elongate body engageable with the upper edges of the two associated flaps to hold the flaps such that they extend in opposite directions from each other. The elongate body advantageously has, at its lengthwise ends, downwardly projecting tabs engageable with the upper edges of the rear and front walls to keep the container in the folded position. Each retaining element may be returned to its locked position by an elastic return structure.

Each retaining element may be joined to a rod slidably guided by at least one of the associated flaps. The rod may comprise an extension of a shaft of articulation connecting the two flaps. In this case, the elastic return structure may include a spring located in the extension of the articulation shaft of the two flaps. The spring can be accommodated in a housing that has a lower part and an upper part that are slidable into each other and are joined to the rod of the retaining element and to one of the flaps, the spring operating with compression to force the lower and upper parts apart.

In another particular embodiment of the invention, the container may have at least one retaining element comprised of a frame articulated on the upper part of the front wall or the rear wall and engageable with the other of the rear or front wall, thus preventing the rear and front walls from coming together and locking the container in the unfolded position. Advantageously, the frame may be articulated at one end to the rear wall and is able to snap into the opposite end in a clip joined to the front wall.

In another particular embodiment of the invention, the container may have at least one retaining element articulated at one end on either the front or the rear wall and engageable with the tops of the flaps of at least one of the side walls, to hold the side walls in the unfolded position. Advantageously, the retaining element may comprise a frame articulated at one end to either the front or the rear wall and fitable over the tops of the two flaps of each side wall to hold them in the unfolded position.

Preferably, the bottom wall is provided with a control element, such as a pedal, activatable from the outside of the container. The control element allows the bottom wall to be raised before the front and rear walls are brought together. Still more preferably, at least one of the front and rear walls may be provided with wheels at the lower part.

In one particular embodiment of the invention, the bottom wall may be pivotably mounted on an axle connecting the wheels and supported by the rear wall. As a variant, both the front and the rear walls may be provided with swivel wheels. Still more preferably, at least one of the front and rear walls may be provided with a hooking structure for lifting, tipping, and emptying the container by a collecting vehicle. The hooking structure may advantageously comprise a rim extending from a forward end of the front wall defining a downwardly open recess. Still more preferably, the rear wall may be provided with a handle and a lid for closing the container, pivotably mounted on the handle.

In accordance with another aspect of the invention, there is provided a container for collecting trash comprising front and rear walls formed opposite one another with side walls formed therebetween to define a volume of the container, means for changing the volume of the container by deforming the side walls, and means for selectively maintaining the volume in at least one of at least two predetermined positions.

In accordance with yet another aspect of the present invention, there is provided a method for operating a trash collecting container having front and rear walls formed opposite one another with side walls formed therebetween to define a volume of the container. The method includes changing the volume of the container by deforming the side walls, and selectively maintaining the volume in at least one of at least two predetermined positions. The method may also include filling the container with trash or undesirable waste products after the volume is changed from a folded position to an unfolded position.

BRIEF DESCRIPTION OF THE DRAWINGS

Other characteristics and advantages of the present invention will emerge from reading the detailed description hereinbelow of nonlimiting embodiments of the invention, and examining the attached drawing wherein.

DETAILED DESCRIPTION OF PREFERRED EMBODIMENTS

Figure 1:
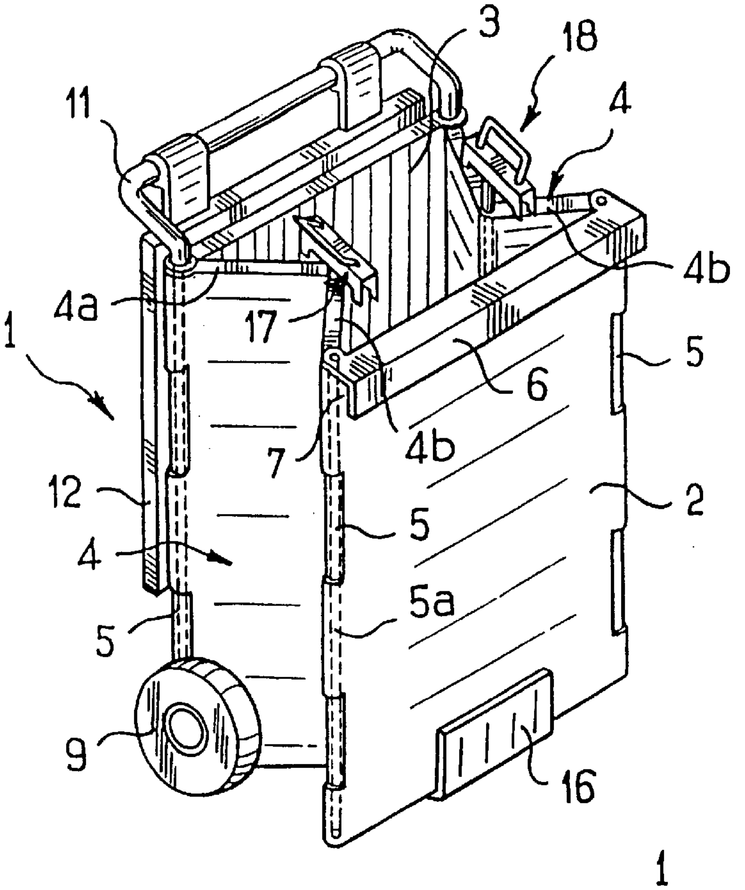
FIG. 1 is a schematic perspective view of a container according to a first embodiment of the invention.
Figure 3:
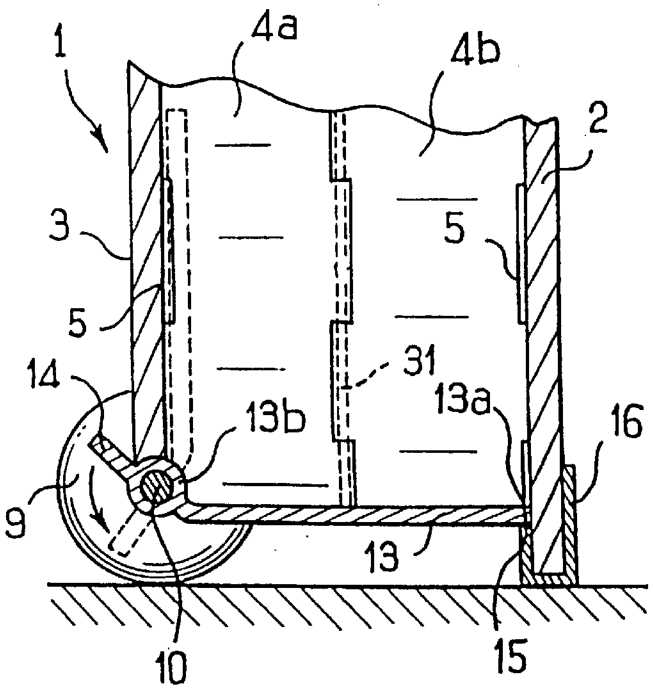
FIG. 3 is a schematic cross-sectional view in a median plane of the lower part of the container shown in FIG. 1.
Figure 2:
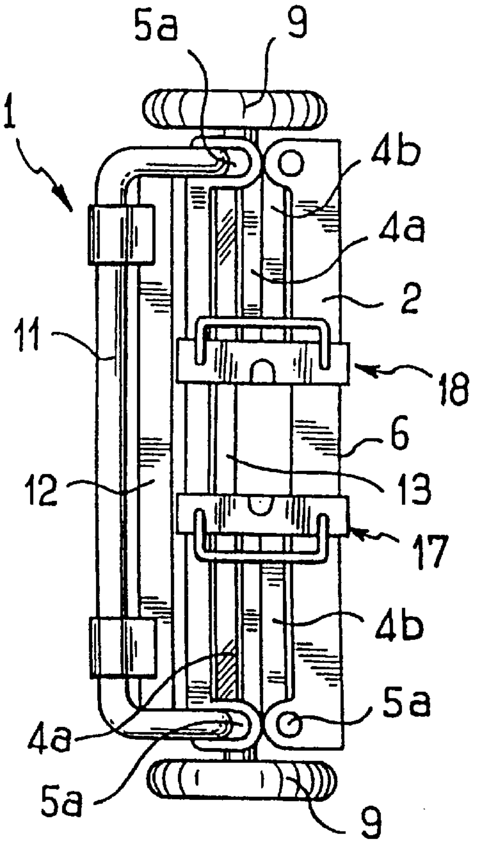
FIG. 2 is a schematic top view of the container shown in FIG. 1, shown in a folded position.

A container 1 shown in FIGS. 1 to 3 has a front wall 2 and a rear wall 3 made of rigid plastic. The front and rear walls 2, 3 are generally planar and parallel and have a substantially rectangular shape, with the same width and height, with the longer sides oriented vertically. The long sides of the front wall 2 and the rear wall 3 extending opposite each other are connected by side walls 4 each of which is comprised of two flaps 4*a* and 4*b*. Each flap 4*a*, 4*b* has a generally rectangular shape with the long sides oriented vertically.

The flaps 4*a*, 4*b* of a given side wall 4 are connected together in a pivotable manner by a lengthwise edge and are also pivotably connected with articulation by the opposite lengthwise edge to the rear wall 3 and the front wall 2, respectively. The flaps 4*a* and 4*b* are articulated, respectively, to the front wall 2 and the rear wall 3 by articulations or pivot axes 5 that have metal shafts 5*a* extending over substantially the entire height of the flaps in superimposed passageways in the flaps and in the associated front or rear wall.

The front wall 2 has at its upper edge a rim 6 projecting forward and defining a downwardly open recess 7 for hooking container 1 to an arm or lifting bar of a waste disposal vehicle, in a manner known of itself.

The rear wall 3 is provided at its lower end with a set of wheels for rolling the container 1. The wheels include two wheels 9 mounted on an axle 10 which traverses the rear wall 3 horizontally and is generally parallel to the front wall 2. The rear wall 3 is provided at the top with a handle 11 extending obliquely rearward.

A lid 12 is pivotably mounted on handle 11 between an open position where it rests opposite the external face of the rear wall 3 and a closed position of the container in the unfolded position, in which it rests on the upper edge of the front wall 2.

The container 1 has a bottom wall 13 pivotably mounted on axle 10. The bottom wall 13 is integral with a pedal 14 which projects behind the container between the wheels 9 and allows the user to raise the bottom wall 13 before folding the container 1.

When the container is unfolded, the bottom wall 13 rests on its end 13*a*, opposite articulation end 13*b* on the rear wall 3, on a shoulder 15 of the front wall 2. In the embodiment described, the shoulder 15 includes the inside edge of a U-shaped member 16 fitted on the lower edge of the front wall 2, as shown in FIGS. 1 and 3. The container 1 normally rests on the ground by wheels 9 and by the bottom of member 16 and/or the lower edge of the front wall 2.

Alternatively, the container 1 is provided at the front with a caster (not shown) pivotably mounted at the lower part of front wall 2 and designed to facilitate the rolling of container 1.

Preferably, the front wall 2, the rear wall 3, the flaps 4*a*, 4*b*, and the bottom wall 13 are cast from high-density polyethylene by extrusion/blow molding or injection holding.

The container 1 is provided with retaining elements 17, 18 able to hold the container in the unfolded position. In the unfolded position, the flaps 4*a*, 4*b*, of each side panel 4 form extensions of each other. More specifically, in the embodiment of FIGS. 1 to 3, each retaining element 17 or 18 is associated with a side panel 4. Each retaining element is mounted to be displaceable along the direction of the geometric articulation axis of the two corresponding flaps 4*a*, 4*b*, between a locked position wherein the retaining element engages the two flaps to hold the flaps in the unfolded position in which the flaps extend collinearly with respect to each other, and a raised position allowing the flaps to be folded.

Figure 4:
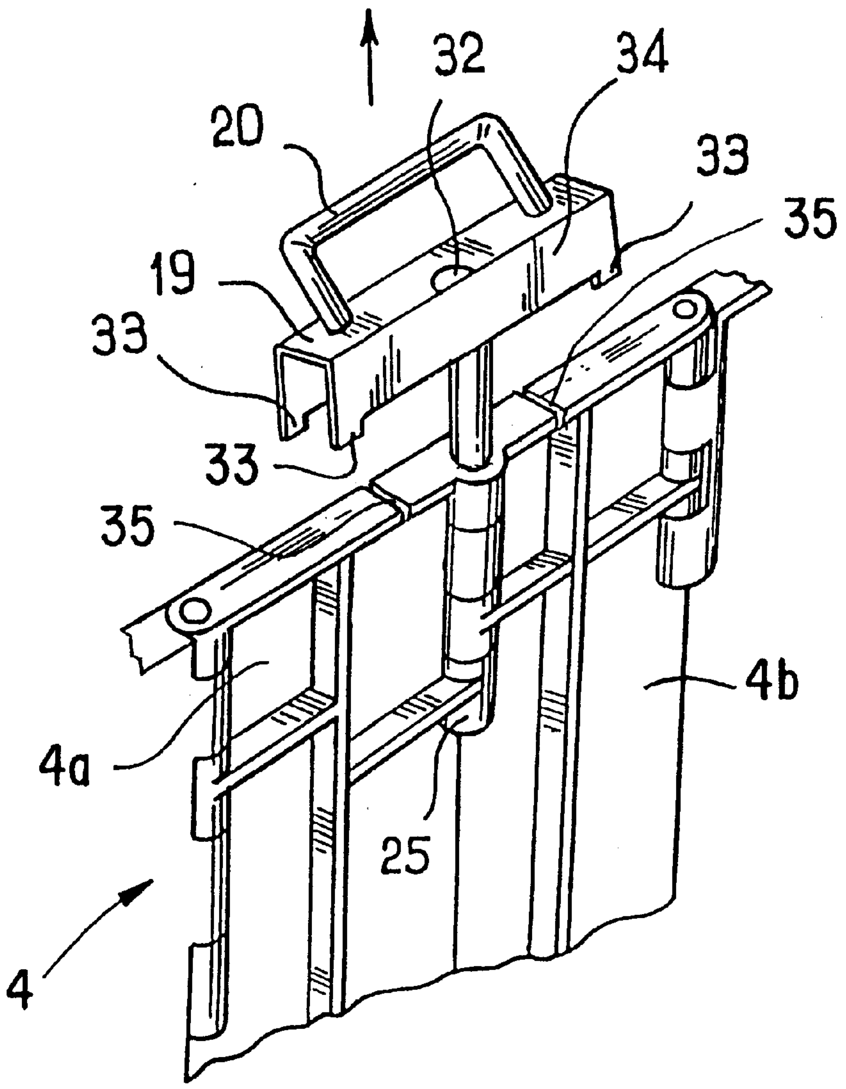
FIG. 4 is a schematic partial perspective view showing the upper part of the articulation of two flaps of a side wall, the associated retaining element being in the raised position for the flaps to be folded.

Each retaining element 17, 18 has, as shown in particular in FIG. 4, an elongate body 19 open at the bottom and shaped to fit over the upper parts of flaps 4*a*, 4*b*, and hold them in the unfolded position in which the flaps extend away from each other in a substantially collinear manner.

Figure 5:
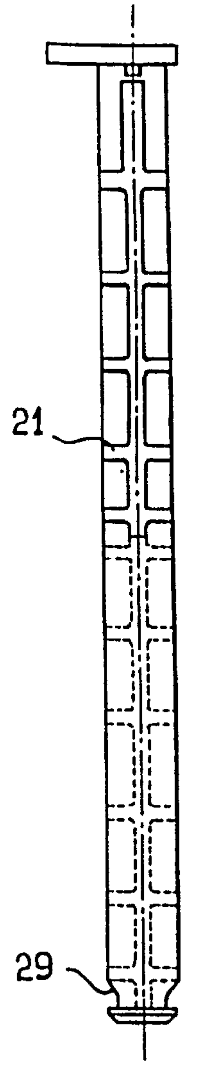
FIGS. 5 and 6 are two side elevations of the rod serving to mount each retaining element in the extension of the articulation shaft of the two associated flaps.
Figure 6:
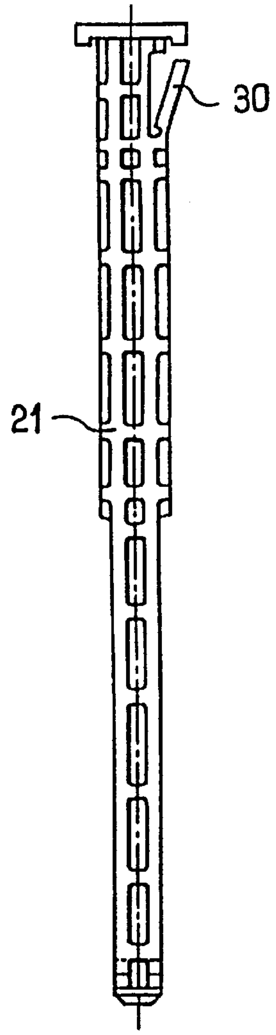
Figure 7:
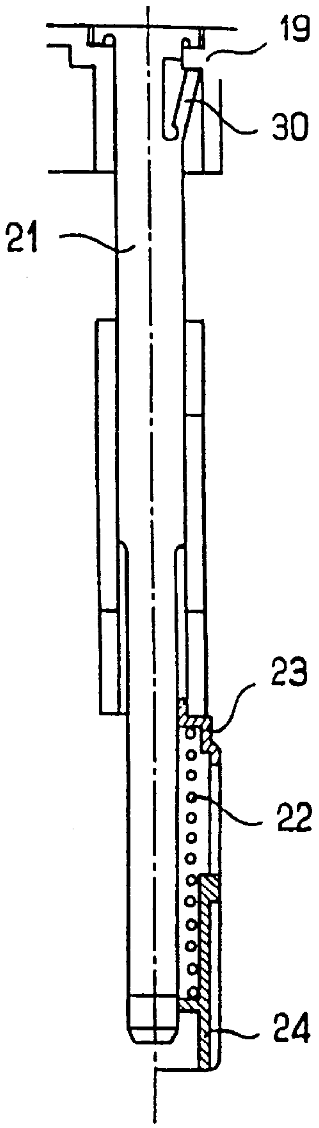
FIG. 7 is a schematic view with a partial section of the rod in place on the container.

Elongate body 19 is surmounted by a handle 20 allowing the user to pull one or both of the retaining elements 17 and 18 upward and is extended downward by a slidably guided rod 21 shown in FIGS. 5, 6, and 7.

Figure 8:
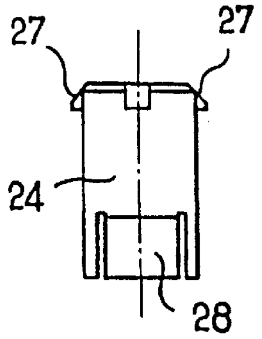
FIG. 8 is an elevation view showing the lower part of a mechanism serving to withdraw the rod downward.
Figure 9:
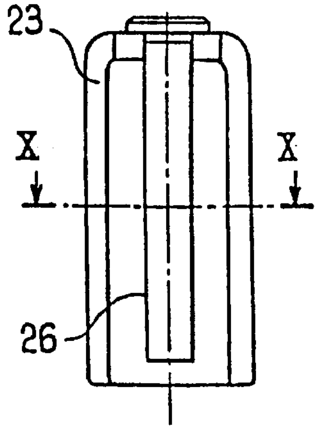
FIG. 9 is an elevation view of the upper part of the mechanism that returns the rod downward.
Figure 10:
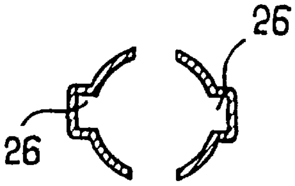
FIG. 10 is a cross section along line X—X in FIG. 9.

Each retaining element 17, 18 is pulled downward by an elastic return means. In the embodiment described, the elastic return means is comprised of a compression spring 22. In particular, the spring 22 is axially interposed between two coaxial cylindrical parts 23, 24 slidable with respect to each other. In FIGS. 8 and 9, the cylindrical parts are shown separately in side elevation. Part 23 is designed to be mounted inside a cylindrical space formed inside a cylinder 25 integral with one of the flaps, the cylinder 25 being shown in FIG. 4. Part 24 snaps into part 23 once the spring 22 has been installed, and part 23 has inside two diametrically opposite lengthwise grooves 26 formed to guide inside part 24 slidably downward over a limited travel distance. Part 24 has at its upper part two elastic tongues 27 able to snap into grooves 26 and at the lower part two other elastic tongues 28 which on the inside have a projection able to engage an annular constriction 29 formed at the lower end of the rod 21. Rod 21 is provided at its upper end with an elastic tongue 30 allowing the rod 21 to snap into an opening 32 in the elongate body 19.

To assemble two flaps 4*a,* 4*b* of a side panel 4, a shaft 31 is engaged in superimposed passageways in flaps 4*a* and 4*b,* as shown in FIG. 1. The shaft 31 extends over only a part of the height of flaps 4*a* and 4*b* from their lower edges. In the particular example shown in FIG. 4, flaps 4*a* and 4*b* have, at their upper parts, four cylinder sections traversed axially by passageways that are superimposed to receive rod 21 and part 23, as shown in FIG. 4, and the lower cylinder section corresponds to the cylinder 25.

Rod 21 is inserted from the top into opening 32 of the elongate body 19 until the elastic tongue 30 snaps into place. Part 24 is snapped into part 23 after the spring 22 has been installed and the assembly is locked into the space provided inside the cylinder 25, being introduced thereinto at the bottom. Retaining element 17 or 18, with corresponding rod 21, is inserted from the top into the four superimposed cylinders until annular constriction 29 snaps into part 24. Part 24 is urged by the spring 22 and returns the rod 21 downward.

As shown in FIG. 4, the elongate body 19 has at its lengthwise ends downwardly projecting tabs 33 able to rest on the outer and upper edges of front wall 2 and rear wall 3 to keep the container folded, as illustrated in FIG. 2.

Elongate body 19 can have internal transverse reinforcing walls (not shown), connecting its side walls 34. In this event, notches 35 are provided on the upper edges of flaps 4*a* and 4*b* and are designed to accommodate the transverse walls when the elongate body 19 covers the upper edges of the flaps 4*a* and 4*b* to keep them in the unfolded position.

As indicated above, when the container is in the unfolded position, for filling or emptying, retaining elements 17 and 18 grip the upper edges of the flaps 4*a* and 4*b* and each of the side panels 4 to hold the panels in a substantially collinear fashion. Retaining elements 17 and 18 are held in this locked position by the action of springs 22.

To fold the container 1, the user lifts retaining elements 17 and 18 until tabs 33 are above the upper edges of flaps 4*a* and 4*b,* and the user also tilts the bottom 13 by pressing pedal 14. The bottom 13 abuts the internal face of rear wall 3, as shown in FIG. 3. The user brings the front wall 2 and the rear wall 3 together, with the assistance if necessary of the retaining elements 17 and 18. The flaps 4*a* and 4*b* pivot toward the inside of the container 1 until the latter is fully folded, as shown in FIG. 2. The flaps 4*a* and 4*b* rest against each other and against the front wall 2 and the bottom wall 13. When the distance between the upper outside edges of the front wall 2 and the rear wall 3 becomes less than the distance separating the tabs 33 of the opposite lengthwise ends of the elongate body 19, the retaining elements 17 and 18 automatically engage the front and rear walls to hold the container in the folded position. Retaining elements 17 and 18 are brought back into the locked position of the container by the springs 22.

To unfold the container, the user raises the retaining elements 17 and 18 to release the tabs 33, then pushes apart retaining elements 17 and 18 to facilitate unfolding of the side panels 4.

Figure 11:
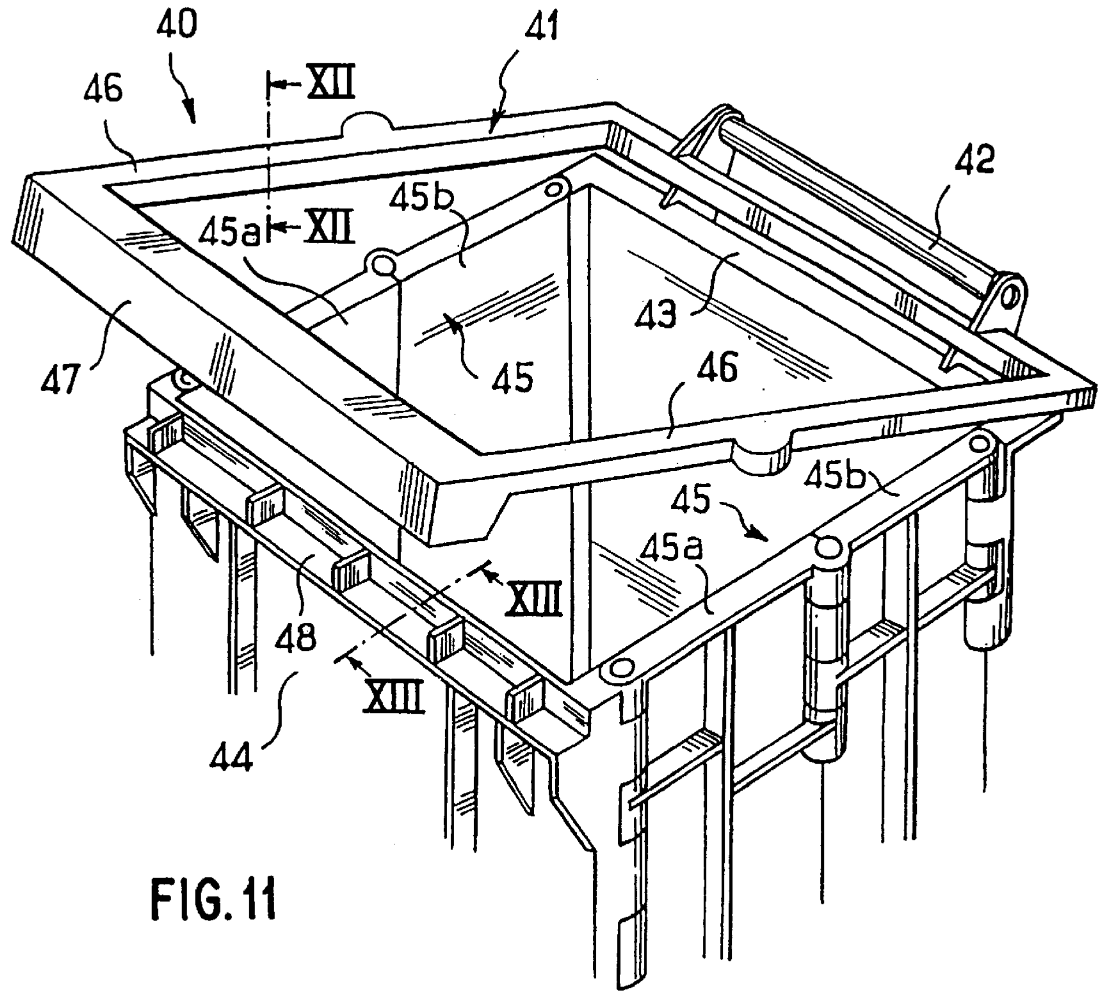
FIG. 11 is a schematic perspective view of a container according to a second embodiment of the invention.
Figure 12:
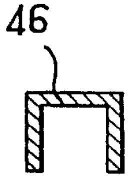
FIG. 12 is a cross section along line XII—XII of FIG. 11.

FIG. 11 shows a container 40 according to a second embodiment of the invention. The container 40 differs from the previous container by the absence of retaining elements 17 and 18, which are replaced by a frame 41 pivotably mounted at one end on a handle 42 integral with a rear wall 43 of the container 40. The container 40 has a front wall 44, and two side walls 45, each comprised of two flaps 45*a,* 45*b* articulated to each other, and a tilting bottom (not shown) similar to that of the container 1 described above.

Figure 13:
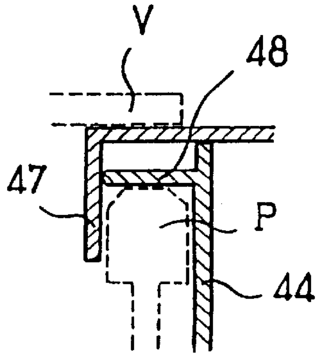
FIG. 13 is a cross section along line XIII—XIII of FIG. 11.

The frame 41 is shaped to fit over each side wall 45 to hold the flaps 45*a,* 45*b* in a substantially collinear fashion. Side parts 46 of frame 41 are shaped to fit over the upper edges of side walls 45 in the unfolded position and, in cross section, as shown in FIG. 13, have a section with the general shape of a U open at the bottom. The frame 41 is provided at the front with a rim 47 which, when fitted over side walls 45, creates with the front wall 44 a downwardly open recess allowing introduction of a lifting element P (FIG. 13) of a trash-collecting vehicle. The front wall 4 has a rib 48 projecting outward and designed to serve as a stop for the lifting element P. Before the container is tipped over by the collecting vehicle, a plate V in the vehicle approaches or contacts the top of the frame 41 to prevent it from pivoting and to hold the container in the unfolded position. To fold the container, the user raises frame 41 and pivots it rearward until it extends opposite the outside face of the rear wall 43.

Figure 14:
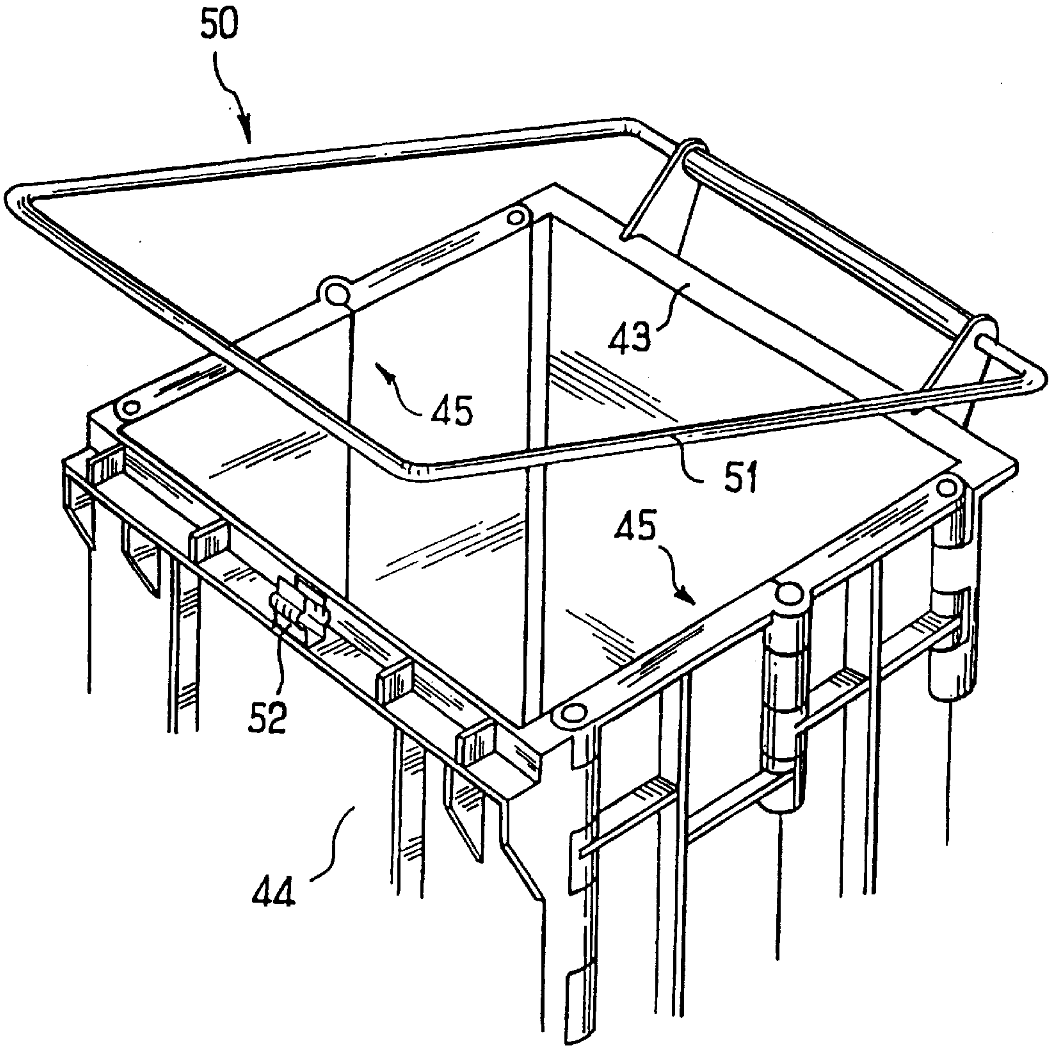
FIG. 14 is a partial schematic perspective view of a container according to a third embodiment of the invention.

FIG. 14 shows a container 50 according to a third embodiment of the invention. The container 50 differs from container 40 described above in that the frame 41 is replaced by a frame 51 articulated at one end on the rear wall 43 and is engageable at the other end with a clip 52 integral with the front wall 44. In the unfolded position of the container, the frame 51 is held at the front by the clip 52, thus preventing the front wall 44 and the rear wall 43 from coming together. To fold the container, the user raises the front end of the frame 51 to disengage it from the clip 52, thus causing the frame 51 to pivot rearward until it is opposite the outside face of rear wall 43.

Figure 15:
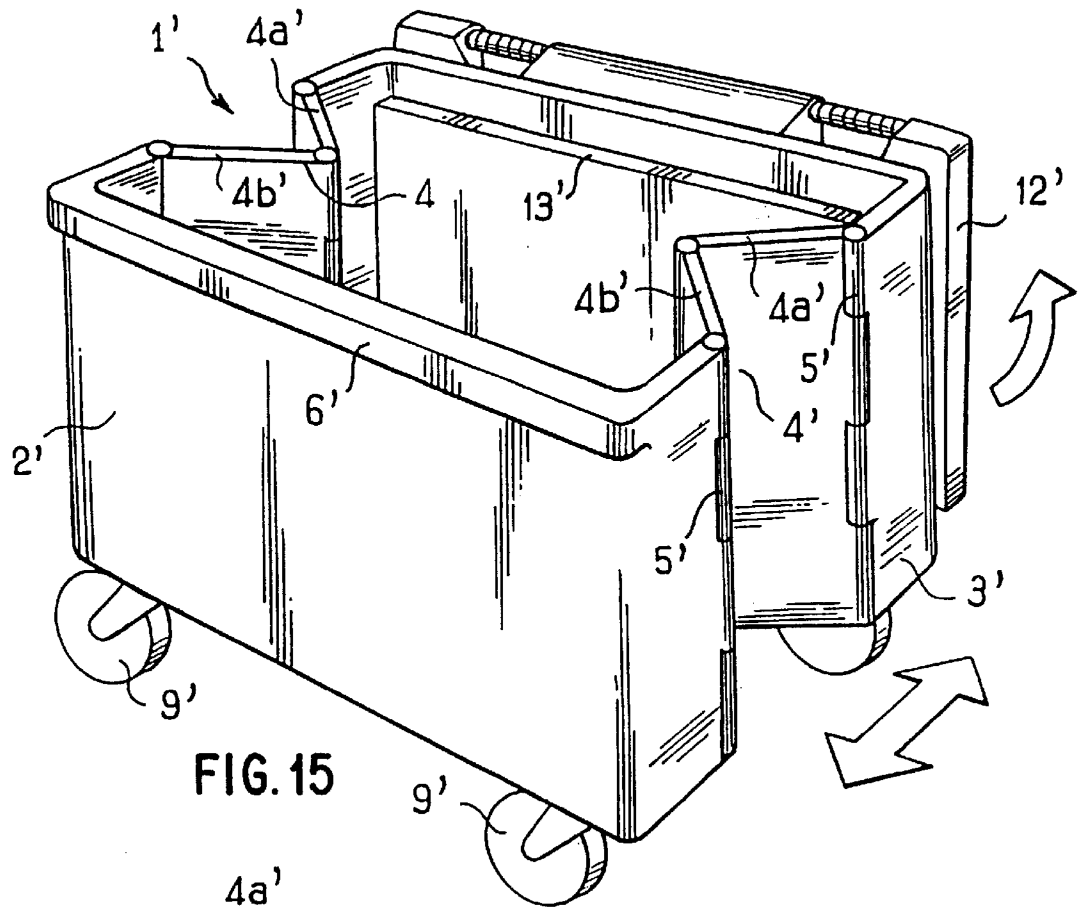
FIGS. 15 and 16 are schematic perspective views of a container according to a fourth embodiment of the invention, while being either folded or unfolded and in the folded state, respectively.
Figure 16:
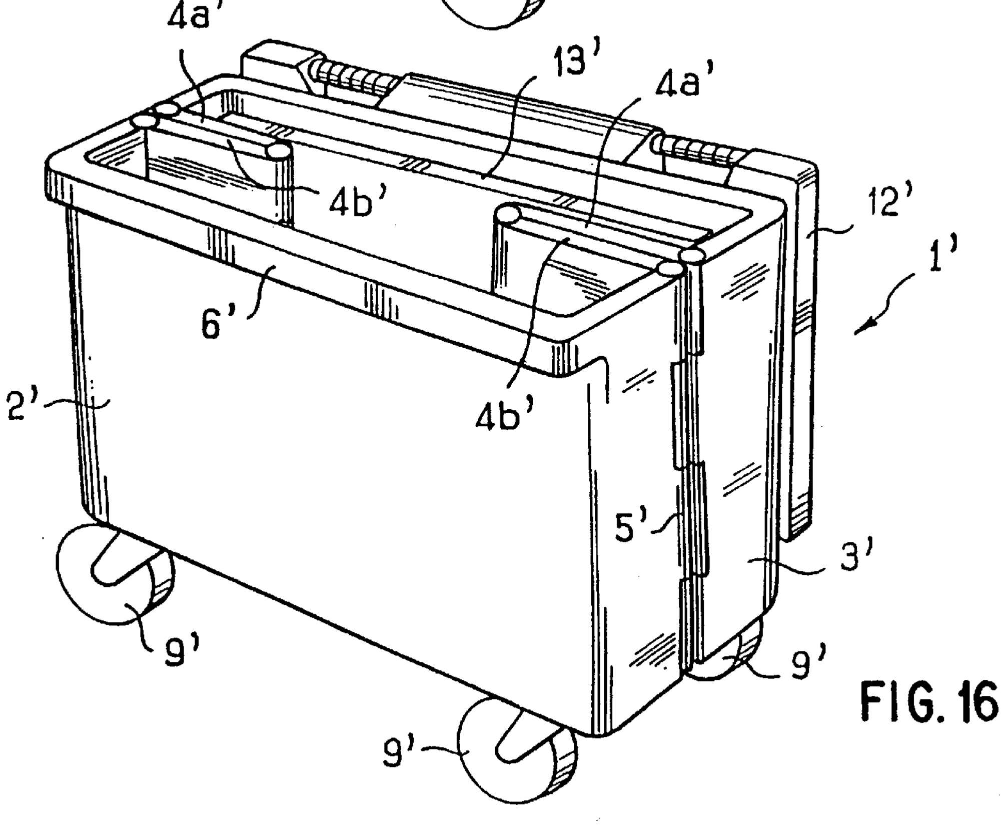

Of course, the invention is not limited to the embodiments described above. For example, FIGS. 15 and 16 show a container 1' according to a fourth embodiment of the invention. In FIGS. 15 and 16, elements functionally similar to those of previous embodiments, and not described in detail, have received identical reference numerals with the addition of a prime.

Container 1' differs from those previously described principally in that it has no means for holding the container in the unfolded position other than the bottom wall. Container 1' has dimensions defining a volume (for example, 100 gallons or more) larger than that of the volumes of the containers previously described (for example, up to 30, 40, 50, 60, 70, 80, 90 or 100 gallons). Of course, the container 1' could have a volume less than 100 gallons, and the other containers could have volumes less than 30 gallons, or greater than 100 gallons. The container 1' rests on four swivel wheels 9', for example, pivoting about vertical axes. For example, two wheels 9' are attached to each of the front wall 2' and the rear wall 3'. In this embodiment of the invention, raising of the bottom wall 13' can be assisted by a spring mechanism or jack mechanism known of itself (not shown).

In the embodiment of FIGS. 15 and 16, flaps 4*a'* and 4*b'* are articulated together by means of articulations comprised of hinges 5' each of which has a pin engaged over the entire height of the parts to be pivotably assembled, in superimposed passageways in the latter. Alternatively, hinges 5' could be replaced by living hinges integrally formed when molding the front and rear walls, with a molded connecting portion between the front and rear walls forming the hinge. In a variant not shown, each side panels made with more than two flaps.

To fold the container 1', the user raises the bottom wall and brings the front wall 2' and the rear wall 3' together. Flaps 4*a'* and 4*b'* then pivot toward the inside of the container 1' until the latter is fully folded, as shown in FIG. 16.

The bottom wall can be provided at its periphery with a sealing lip that is applied, when the container is in the unfolded position, to the inside face of the front and rear walls and side panels.

In the first three embodiments corresponding to FIGS. 1, 11 and 14, retaining elements denoted 17 and 18, 41 and 51, respectively, allow the upper part of the container to be reinforced in the unfolded position and ensure good retention while the container is being emptied.

The invention has been described with reference to preferred embodiments thereof, which are intended to be illustrative, not limiting. Various modifications will be apparent to those skilled in the art which are within the spirit and scope of the invention as defined in the appended claims.

What is claimed is:

1. A container for collecting trash, comprising:

front and rear walls formed opposite one another with side walls formed therebetween to define a volume of the container;

means for changing the volume of the container by deforming the side walls;

hooking means for lifting and tipping the container such that substantially all of the trash in the container is emptied via gravity during said tipping; and means for selectively maintaining the volume of the container in at least a maximum volume position during said lifting, tipping and emptying of the container, said means for selectively maintaining being displaceable with respect to the side walls between a locked position in which the side walls are held in the maximum volume position of the container during said lifting, tipping and emptying of the container, and a raised position allowing the side walls to fold into a folded position smaller than the maximum volume position, said means for selectively maintaining including at least one retaining element and a spring biased mechanism that maintains said at least one retaining element positively locked to the side walls during said lifting and tipping of the container.

2. A container according to claim 1, wherein said means for changing the volume includes forming each of said side walls with two molded flaps connected with an integrally molded living hinge.

3. A container according to claim 1, wherein said at least one retaining element fixes said volume to minimum and the maximum amounts.

4. A container for collecting trash, comprising:

a rear wall;

a front wall;

two side walls connecting the front and rear walls, wherein the two side walls are deformable and foldable to allow the front and rear walls to approach one another;

a bottom wall pivotably mounted on one of the front wall and the rear wall;

a rim attached to one of the rear wall and the front wall that cooperates with a waste disposal vehicle that lifts, tips and empties trash from the container;

a retaining element separate from the bottom wall that maintains the two side walls in an unfolded position during lifting and tipping of the container such that substantially all of the trash in the container is emptied via gravity during said tipping, said retaining element being fixed to one of the front wall, the rear wall and the two side walls; and means for locking the retaining element substantially fixed with respect to the two side walls during said lifting and tipping, said means for locking including at least one of 1) a spring biased mechanism that maintains the retaining element positively locked to the two side walls; 2) a stationary resilient clip fixed to the front wall that receives and holds the retaining element; and 3) a plate of a collection vehicle that rests against the retaining element when positioned at the front wall.

5. A container for collecting trash, comprising:

a rear wall;

a front wall;

two side walls connecting the front and rear walls, wherein the two side walls are deformable and foldable to allow the front and rear walls to approach one another; and a bottom wall pivotably mounted on one of the front and the rear walls, wherein each of said side walls has two flaps articulated to each other along one edge and articulated along opposite edges to the rear wall and the front wall, respectively, said container further comprising at least one element for retaining the container in an unfolded position, wherein said at least one element comprises a retaining element for each of said two side walls, each said retaining element being displaceable along a geometric articulation axis of the two associated flaps between a locked position in which the at least one element engages the two associated flaps to hold the two associated flaps in a substantially collinear, unfolded position, and a raised position allowing the two associated flaps to fold into a folded position, wherein each said retaining element is shaped to fit over and retain the front wall and the rear wall when the container is in the folded position.

6. A container for collecting trash, comprising:

a rear wall;

a front wall;

two side walls connecting the front and rear walls, wherein the two side walls are deformable and foldable to allow the front and rear walls to approach one another; and a bottom wall pivotably mounted on one of the front and the rear walls, wherein each of said side walls has two flaps articulated to each other along one edge and articulated along opposite edges to the rear wall and the front wall, respectively, said container further comprising at least one element for retaining the container in an unfolded position, wherein said at least one element comprises a retaining element for each of said two side walls, each said retaining element being displaceable along a geometric articulation axis of the two associated flaps between a locked position in which the at least one element engages the two associated flaps to hold the two associated flaps in a substantially collinear, unfolded position, and a raised position allowing the two associated flaps to fold into a folded position, wherein each said retaining element has an elongate body engageable with upper edges of the two associated flaps to hold the two associated flaps so that they are substantially aligned with each other, and said elongate body has at its lengthwise ends downwardly projecting tabs engageable with upper edges of the rear wall and the front wall to hold the container in the folded position.

7. A container for collecting trash, comprising:

a rear wall;

a front wall;

two side walls connecting the front and rear walls, wherein the two side walls are deformable and foldable to allow the front and rear walls to approach one another; and a bottom wall pivotably mounted on one of the front and the rear walls, wherein each of said side walls has two flaps articulated to each other along one edge and articulated along opposite edges to the rear wall and the front wall, respectively, said container further comprising at least one element for retaining the container in an unfolded position, wherein said at least one element comprises a retaining element for each of said two side walls, each said retaining element being displaceable along a geometric articulation axis of the two associated flaps between a locked position in which the at least one element engages the two associated flaps to hold the two associated flaps in a substantially collinear, unfolded position, and a raised position allowing the two associated flaps to fold into a folded position, wherein each said retaining element is returned by elastic return means to said locked position.

8. A container for collecting trash, comprising:

a rear wall;

a front wall;

two side walls connecting the front and rear walls, wherein the two side walls are deformable and foldable to allow the front and rear walls to approach one another; and a bottom wall pivotably mounted on one of the front and the rear walls, wherein each of said side walls has two flaps articulated to each other along one edge and articulated along opposite edges to the rear wall and the front wall, respectively, said container further comprising at least one element for retaining the container in an unfolded position, wherein said at least one element comprises a retaining element for each of said two side walls, each said retaining element being displaceable along a geometric articulation axis of the two associated flaps between a locked position in which the at least one element engages the two associated flaps to hold the two associated flaps in a substantially collinear, unfolded position, and a raised position allowing the two associated flaps to fold into a folded position, wherein each said retaining element is joined to a slidably guided rod by at least one of the two associated flaps along an extension of an articulation shaft connecting the two associated flaps, and a spring is located in the extension of said articulation shaft of the two associated flaps.

9. A container for collecting trash, comprising:

a rear wall;

a front wall;

two side walls connecting the front and rear walls, wherein the two side walls are deformable and foldable to allow the front and rear walls to approach one another; and a bottom wall pivotably mounted on one of the front and the rear walls, wherein each of said side walls has two flaps articulated to each other along one edge and articulated along opposite edges to the rear wall and the front wall, respectively, said container further comprising at least one element for retaining the container in an unfolded position, wherein said at least one element comprises a retaining element for each of said two side walls, each said retaining element being displaceable along a geometric articulation axis of the two associated flaps between a locked position in which the at least one element engages the two associated flaps to hold the two associated flaps in a substantially collinear, unfolded position, and a raised position allowing the two associated flaps to fold into a folded position, wherein each said retaining element is provided with a handle.

10. A container according to claim 9, wherein each said retaining element is shaped to fit over and retain the front wall and the rear wall when the container is in the folded position.

11. A container according to claim 9, wherein each said retaining element has an elongate body engageable with upper edges of the two associated flaps to hold the two associated flaps so that they are substantially aligned with each other.

12. A container according to claim 11, wherein said elongate body has at its lengthwise ends downwardly projecting tabs engageable with upper edges of the rear wall and the front wall to hold the container in the folded position.

13. A container according to claim 9, wherein each said retaining element is returned by elastic return means to said locked position.

14. A container according to claim 9, wherein each said retaining element is joined to a slidably guided rod by at least one of the two associated flaps along an extension of an articulation shaft connecting the two associated flaps.

15. A container according to claim 14, further comprising a spring located in the extension of said articulation shaft of the two associated flaps.

16. A container according to claim 15, wherein said spring is accommodated in a housing having a lower part and an upper part that are slidable into each other, one of the upper and lower parts being joined to said rod and the other to one of the two associated flaps, said spring operating with compression to urge said upper and lower parts apart.

17. A method for operating a trash collecting container having front and rear walls formed opposite one another with side walls formed therebetween to define a volume of the container, said method comprising:

changing the volume of the container by deforming the side walls from a minimum volume position to a maximum volume position;

locking the container in the maximum volume position;

filling the container with trash;

lifting and tipping the container such that substantially all of the trash from the container is emptied via gravity during said tipping while the container is locked in the maximum volume position;

returning the container to said minimum volume position; and selectively maintaining the volume in the maximum and minimum volume positions, wherein the volume is selectively maintained in the maximum volume position by at least one of:

a) retaining element separate from the bottom wall that maintains the two side walls in an unfolded position during lifting and tipping of the container such that substantially all of said trash in the container is emptied by gravity during said tipping, the container being returned to said minimum volume position by releasing the retaining element, said retaining element being fixed to one of the front wall, the rear wall and the side walls, and means for locking the retaining element substantially fixed with respect to said side walls during said lifting and tipping, said means for locking including at least one of (1) a spring biased mechanism that maintains the retaining element positively locked to the side walls; (2) a stationary resilient clip fixed to the front wall that receives and holds the retaining element; and (3) a plate of a collection vehicle that rests against the retaining element when positioned at the front wall, and b) the bottom wall, the bottom wall being pivotably mounted on an axle supported by said rear wall, said rear wall having a lower part with at least one wheel connected to said axle, said bottom wall being provided with a pedal allowing said bottom wall to be raised before said front and rear walls come together for returning the container to said minimum volume position.

18. A method according to claim 17, wherein said changing includes forming each of said side walls with two molded flaps connected with an integrally molded living hinge.

* * * * *